(12) United States Patent
Peschmann

(10) Patent No.: US 7,100,231 B2
(45) Date of Patent: Sep. 5, 2006

(54) FOLDABLE RAMP HAVING RUNG HINGE

(75) Inventor: Joseph J. Peschmann, Plover, WI (US)

(73) Assignee: Cequent Trailer Products, Inc., Mosinee, WI (US)

( * ) Notice: Subject to any disclaimer, the term of this patent is extended or adjusted under 35 U.S.C. 154(b) by 0 days.

(21) Appl. No.: 10/900,023

(22) Filed: Jul. 27, 2004

(65) Prior Publication Data
US 2005/0055783 A1 Mar. 17, 2005

Related U.S. Application Data

(60) Provisional application No. 60/490,650, filed on Jul. 28, 2003.

(51) Int. Cl.
*E01D 1/00* (2006.01)

(52) U.S. Cl. ............... 14/69.5; 414/537; 14/24

(58) Field of Classification Search .......... 404/69.5, 404/71.1; 414/537, 557; 14/69.5, 71.1, 14/2, 2.4, 24, 25; 182/216–218, 163, 223
See application file for complete search history.

(56) References Cited

U.S. PATENT DOCUMENTS

| | | | |
|---|---|---|---|
| 426,209 A * | 4/1890 | McIntyre .............. | 14/69.5 |
| 963,918 A | 7/1910 | Miller | |
| 1,194,819 A | 8/1916 | Clark | |
| 1,232,437 A * | 7/1917 | Simpson .............. | 14/69.5 |
| 1,504,744 A | 8/1924 | Cox | |
| 1,568,303 A | 1/1926 | Webster | |
| 1,626,597 A | 5/1927 | Cantor | |
| 1,635,462 A | 7/1927 | Cummings | |
| 1,659,928 A | 2/1928 | Townsend | |
| 2,122,301 A | 6/1938 | Soss et al. | |
| 2,141,529 A | 12/1938 | Gravelle | |
| 3,339,968 A | 9/1967 | Hall | |
| 3,352,440 A | 11/1967 | Wilson | |
| 3,510,015 A | 5/1970 | Roshaven | |
| 3,517,772 A | 6/1970 | Weis et al. | |
| 3,532,058 A | 10/1970 | van der Meide | |
| 3,580,373 A | 5/1971 | Stickle | |
| 3,613,920 A | 10/1971 | Flamm | |
| 3,642,156 A | 2/1972 | Stenson | |
| 3,713,553 A * | 1/1973 | Curtis et al. .............. | 414/537 |
| 3,735,454 A | 5/1973 | Goldstein | |
| 3,737,058 A | 6/1973 | Johnson | |
| 3,818,528 A | 6/1974 | Petersen | |

(Continued)

FOREIGN PATENT DOCUMENTS

DE 370353 4/1932

(Continued)

OTHER PUBLICATIONS

Parts and Accessories Catalog, May 26, 1988, p. 223.

*Primary Examiner*—Thomas B. Will
*Assistant Examiner*—Alexandra Pechhold
(74) *Attorney, Agent, or Firm*—Robert H. Earp, III; McDonald Hopkins Co., LPA

(57) ABSTRACT

A foldable ramp having an improved hinge construction to increase load capacity. The foldable ramp overcomes the disadvantages of the prior art by providing a ramp having a first ramp section and a second ramp section, pivotable relative to each other between a folded storage position and an open working position wherein the ramp sections are prevented from pivoting to a coplanar position relative to each other in the working position so as to increase load capacity.

17 Claims, 5 Drawing Sheets

U.S. PATENT DOCUMENTS

| | | | |
|---|---|---|---|
| 3,977,545 A | 8/1976 | Lloyd | |
| 3,984,891 A | 10/1976 | Weinmann | |
| 4,098,414 A | 7/1978 | Abiera | |
| 4,127,201 A | 11/1978 | Baumann | |
| 4,186,901 A | 2/1980 | Shorey | |
| 4,285,514 A * | 8/1981 | Romero | 472/89 |
| 4,443,905 A * | 4/1984 | Kopp | 14/69.5 |
| 4,478,549 A | 10/1984 | Stelly et al. | |
| 4,528,711 A | 7/1985 | Packer | |
| 4,668,002 A | 5/1987 | Hanson | |
| 4,722,109 A | 2/1988 | Mountz | |
| 4,726,155 A | 2/1988 | Nahmias | |
| 4,727,612 A | 3/1988 | Smith | |
| 4,735,454 A | 4/1988 | Bernard | |
| 4,761,847 A | 8/1988 | Savage et al. | |
| 4,779,298 A * | 10/1988 | Nichols et al. | 14/69.5 |
| 4,853,999 A | 8/1989 | Smith | |
| 4,864,672 A * | 9/1989 | Altieri et al. | 14/69.5 |
| 4,874,284 A | 10/1989 | New, Jr. | |
| 4,878,800 A | 11/1989 | Dell | |
| 4,995,129 A | 2/1991 | Comardo | |
| 5,096,362 A | 3/1992 | Best | |
| 5,133,584 A | 7/1992 | McCleary | |
| 5,133,634 A | 7/1992 | Gingrich et al. | |
| 5,156,432 A | 10/1992 | McCleary | |
| 5,169,202 A | 12/1992 | Cupp et al. | |
| 5,211,437 A | 5/1993 | Gerulf | |
| 5,273,335 A | 12/1993 | Belnap et al. | |
| 5,287,579 A * | 2/1994 | Estevez, Jr | 14/71.1 |
| 5,325,558 A | 7/1994 | Labreche | |
| D353,701 S | 12/1994 | Beavers et al. | |
| 5,438,308 A | 8/1995 | Leupold et al. | |
| 5,440,773 A | 8/1995 | Lentini | |
| 5,481,773 A | 1/1996 | Alten | |
| 5,560,063 A | 10/1996 | Alten et al. | |
| 5,608,937 A | 3/1997 | Seigneur et al. | |
| 5,640,733 A | 6/1997 | Alten et al. | |
| 5,768,733 A | 6/1998 | Kneebone | |
| 5,853,281 A | 12/1998 | Farmer | |
| 5,870,788 A * | 2/1999 | Witkin | 14/69.5 |
| 5,933,898 A | 8/1999 | Estes et al. | |
| 5,988,725 A * | 11/1999 | Cole | 296/61 |
| 6,009,587 A * | 1/2000 | Beeman | 14/69.5 |
| 6,139,249 A | 10/2000 | Lucht | |
| 6,227,593 B1 | 5/2001 | DeValcourt | |
| 6,715,177 B1 * | 4/2004 | Lagergren-Julander | 14/69.5 |
| 6,722,721 B1 * | 4/2004 | Sherrer et al. | 296/61 |
| 6,746,068 B1 * | 6/2004 | Hurd | 296/50 |

FOREIGN PATENT DOCUMENTS

| | | |
|---|---|---|
| DE | 1243589 | 6/1967 |
| DE | 2106972 | 11/1978 |
| DE | 4234592 A1 | 9/1993 |
| GB | 499208 | 1/1939 |
| GB | 1038445 | 8/1966 |
| WO | WO89/06199 | 7/1989 |
| WO | WO94/05878 | 3/1994 |

* cited by examiner

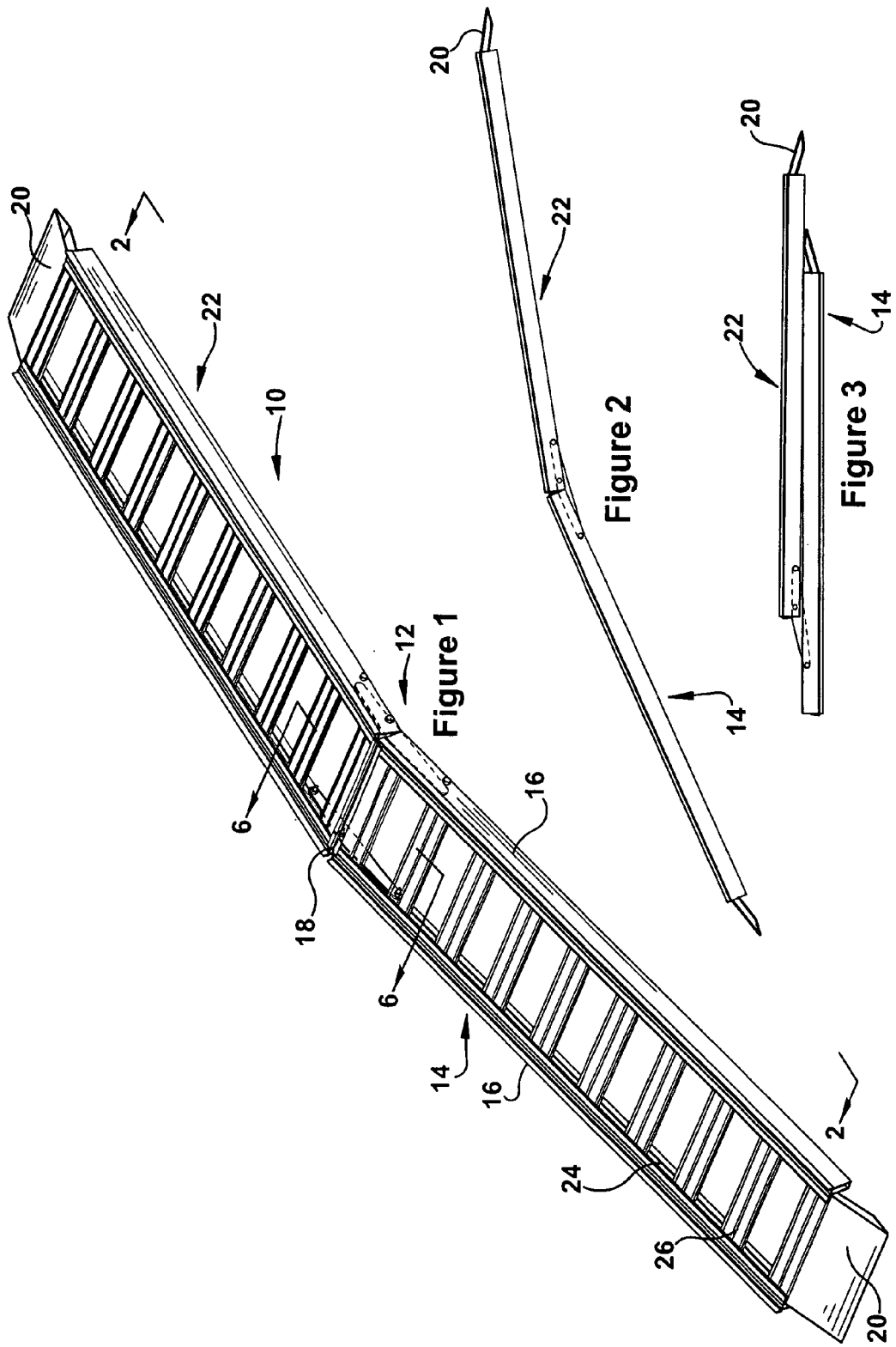

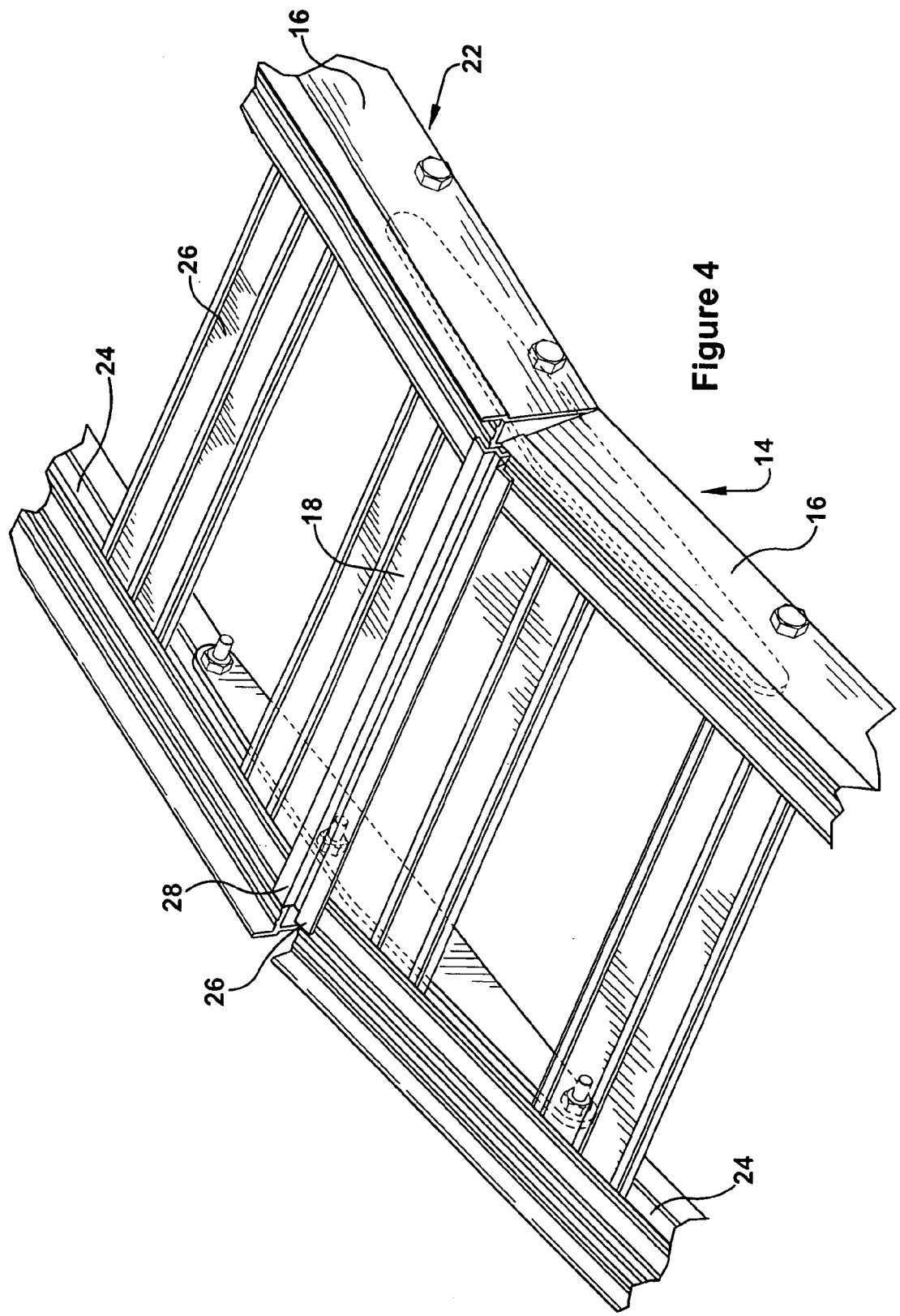

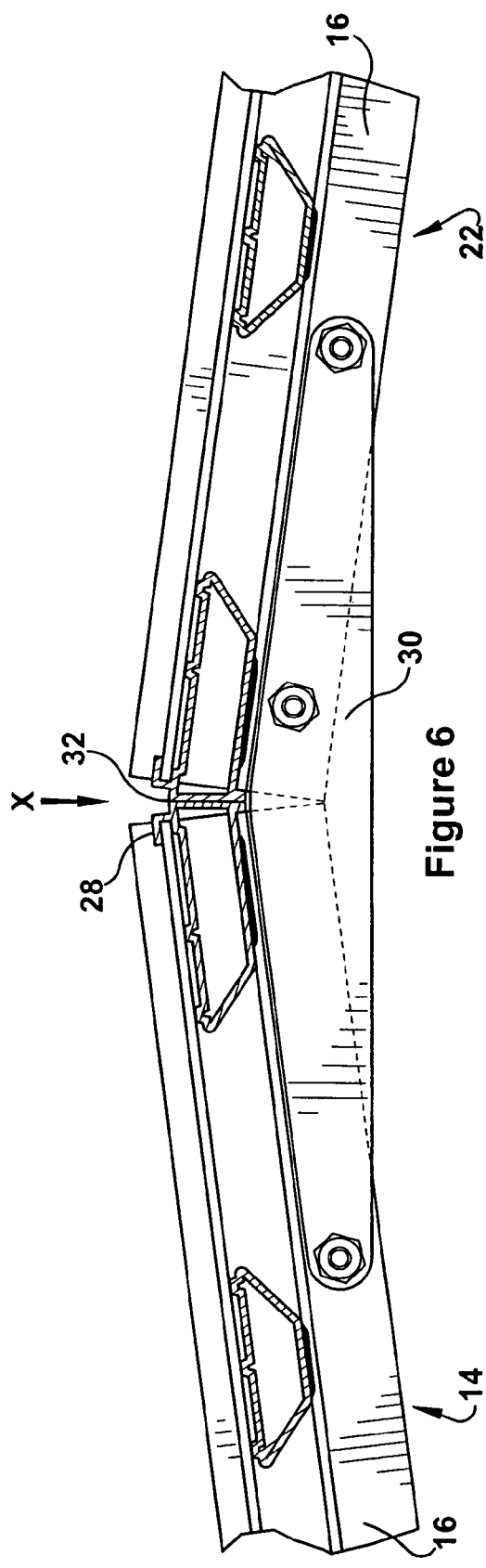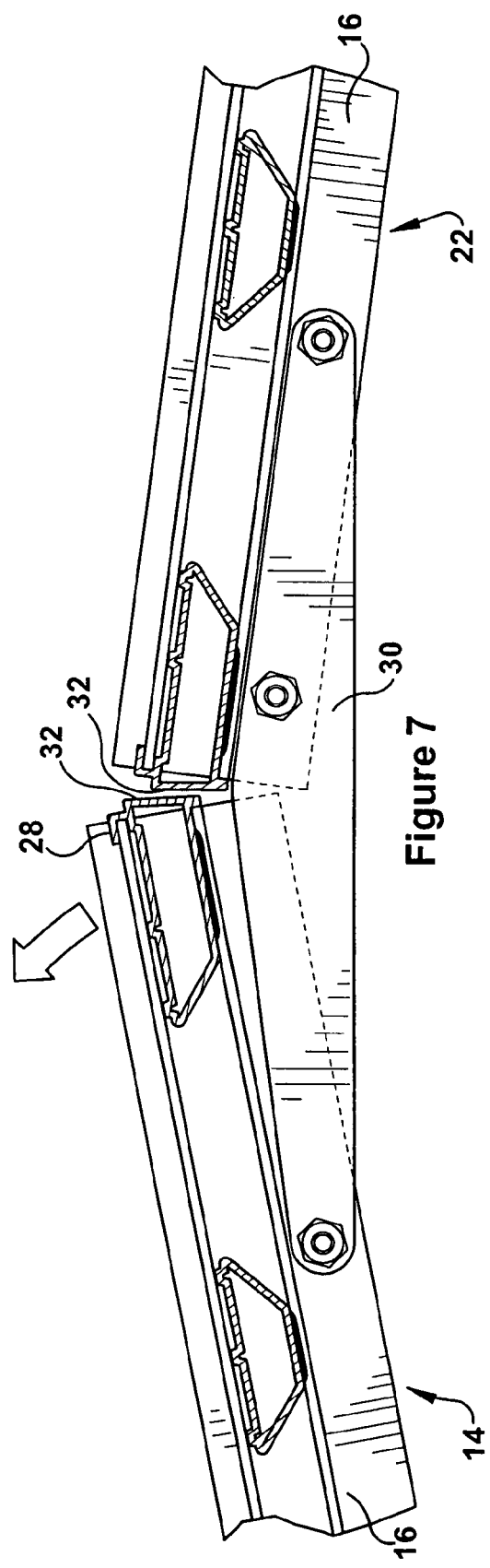

FOLDABLE RAMP HAVING RUNG HINGE

RELATED APPLICATION

This application claims the benefit of priority of Provisional Application Ser. No. 60/490,650, filed on Jul. 28, 2003.

FIELD OF INVENTION

The present invention relates generally to ramps, and more particularly, to foldable ramps having an improved hinge construction to increase load capacity.

BACKGROUND OF THE INVENTION

Numerous types of ramps are used to assist in the loading and unloading of objects from transportation vehicles. Particularly, trucks, vans, trailers and the like utilize ramps to assist in the loading of objects such as ATVs, motorcycles, lawnmowers, etc. Due to the required length of these ramps, it is advantageous that the ramps are foldable so as to increase the use length and decrease the storage length.

Such foldable ramps are typically manufactured from aluminum to promote a light ramp with overall strong properties. Therefore, a user can lift and unfold such a ramp alone when loading or unloading a vehicle from a transportation vehicle. Further, a user may want to use a single ramp to load and unload many different objects having many different weight characteristics. Thus, there is a constant need in the art to provide lighter ramps having ever-increasing load requirements.

The present invention overcomes the disadvantages of the prior art devices by providing a ramp having an improved hinge construction capable of withstanding a greater load then known in the art.

The present invention will be more fully described in the following written description with reference to the accompanying drawings.

BRIEF DESCRIPTION OF THE SEVERAL VIEWS OF THE DRAWING

FIG. 1 is a perspective view of a foldable ramp in an extended position having a hinge construction according to the present invention.

FIG. 2 is a side view of the ramp of FIG. 1.

FIG. 3 is a side view of the ramp of the present invention shown in a folded, storable position.

FIG. 4 is enlarged view showing the hinge construction of the present invention.

FIG. 6 is a cross-sectional side view of the hinge construction of the present invention where the hinge is in its operable, unfolded position.

FIG. 7 is a cross-sectional side view of the hinge construction as shown in FIG. 6, wherein the hinge is being pivoted to its folded position.

DETAILED DESCRIPTION OF THE INVENTION

Figure 5:
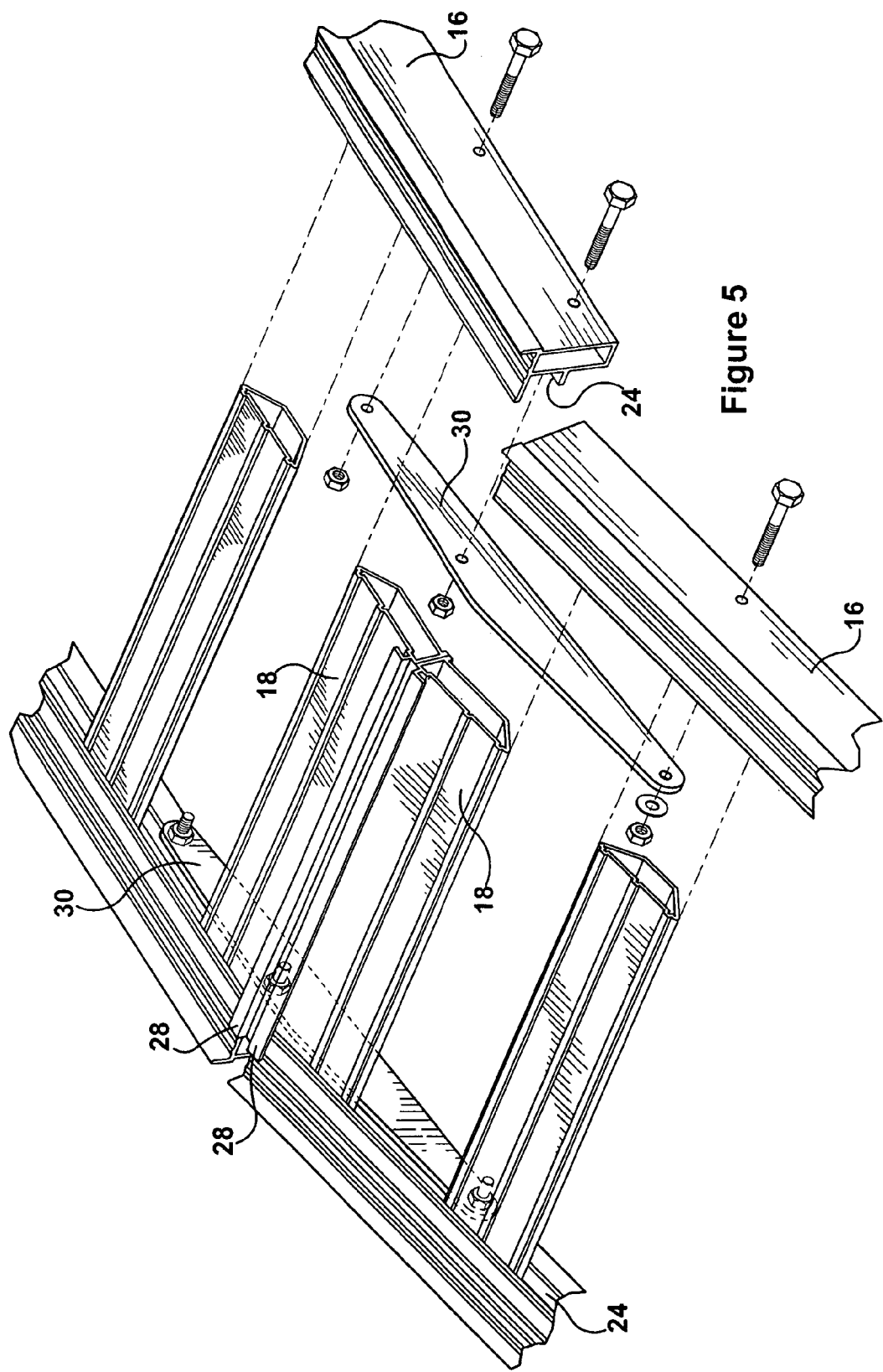
FIG. 5 is a partially exploded view of the hinge construction of FIG. 4.
Figure 8:
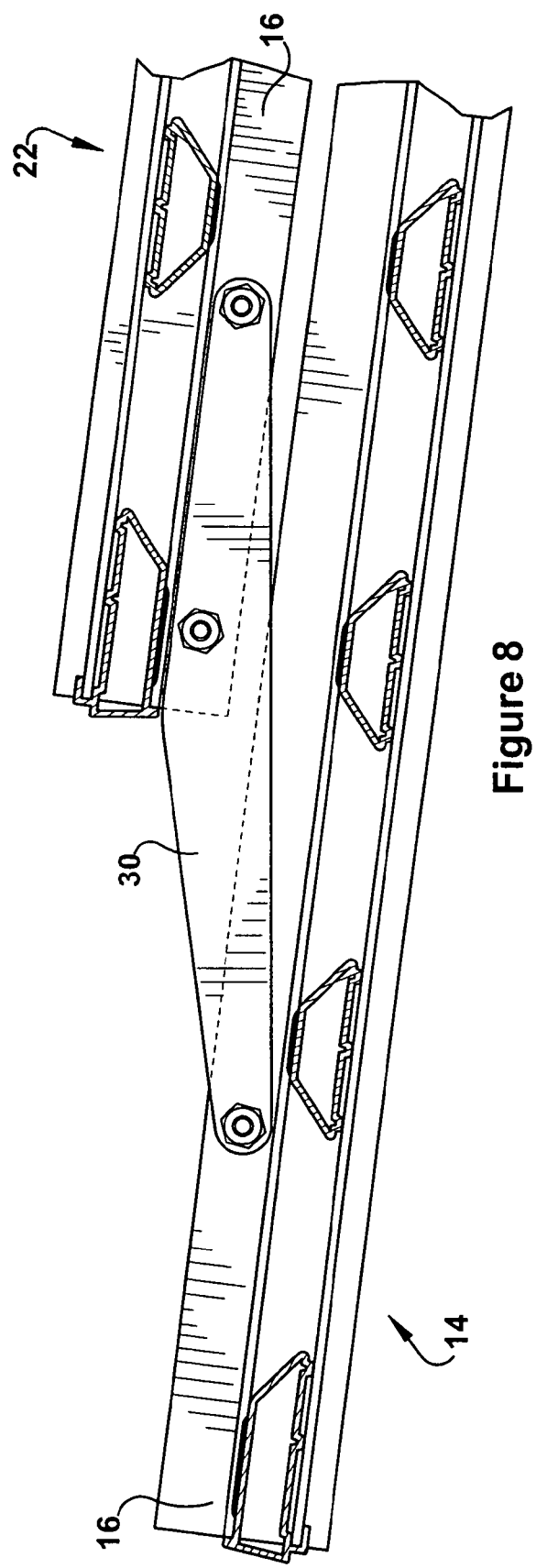
FIG. 8 is a cross-sectional side view of the hinge construction shown in a folded, storage position.

Referring now to the drawings, and in particular to FIG. 1, a foldable ramp, generally designated 10, includes an improved hinge, generally designated 12. The foldable ramp 10 comprises a first ramp section 14 and a second ramp section 22 pivotally connected to each other by hinge 12. The first and second ramp sections 14,22 are generally constructed in the same fashion and comprise a pair of side members 16, an interconnected end member 18, and an interconnected inclined member 20. All of the components of the ramp 10 and hinge construction 12 are preferably manufactured from aluminum so as to provide a light-weight component having a high strength level.

The side members 16 comprise elongated tubular members having a channels 24 located on an inner surface. The end members 18, the inclined members 20, and the rungs 26 are capable of nesting within the inner channels 24 of the side members 16. Preferably, the end members 18, inclined members 20, and rungs 26 are welded to the side members 16. However other suitable means for attachment should be known to those skilled in the art. Therefore, the ramp 10 is foldable between an open, usable position shown in FIG. 2 and a folded, storage position shown in FIG. 3.

The improved hinge construction of the present invention is best shown in FIG. 5. End members 18 are connected at opposite ends to the first and second ramp sections 14,22 as described above. As shown, end member 18 comprises a generally tubular member having an upwardly extending flange 28. The flange 28 is arranged to engage at least a portion of the tubular side member 16 as shown in FIGS. 4 and 5.

A pair of hinge brackets 30 are connected to the inner surface of the side members 16 of both the first and second ramp section 14,22 by nuts and bolts. As shown in FIG. 5, hinge brackets 30 preferably comprise A-shaped members having apertures therethrough for connecting to the first and second ramp members 14,22. As best shown in FIGS. 6 and 7, one side of the A-shaped bracket is bolted to the second ramp section by a two-bolt connection while the other end of the bracket 30 is pivotally connected to the first ramp section or visa versa. Therefore, one of the ramp sections can pivot relative to the other ramp section so that the ramp 10 can be positioned between an extended, operable position shown in FIG. 2 and a folded, storage position shown in FIG. 3

As best shown in FIG. 6, when the first and second ramp sections 14,22 are pivoted to an extended position, the inclined surfaces 32 of each end member 18 engage each other. The inclined surfaces 32 engage in a flush position due to the fact that the first and second ramp sections are connected to the A-shaped bracket 30 along their top, sloping surfaces. Therefore, the first and second ramp members are prevented from pivoting to a horizontal position relative to one another by the A-shaped flanges and the engaging inclined surfaces 32 of the end members 18.

In operation, when the first and second ramp sections are positioned in the usable position as in FIG. 6, the hinge construction can withstand more weight than prior hinge constructions. This is due to the fact that as force is applied to the hinge in the direction of arrow X, the inclined surfaces are forced together and distribute a portion of the force through the side members 16 through the connection between the flanges 28 and the side members 16. Further, the first and second ramp sections are supported by the top surfaces of the A-shaped brackets 30 to distribute additional force through the side member 16. Therefore, because much of the force exerted on the hinge is translated to the side members. And because the hinge is constructed to extend to a position not fully flat, any downward force will force the end members into further engagement thereby transferring additional force through the side members thereby allowing the hinge to withstanding more force.

The invention has been described with reference to the preferred embodiment. Obviously, modifications and alternations will occur to others upon a reading and understanding of this specification. The claims as follows are intended to include all modifications and alterations insofar as they come within the scope of the claims or the equivalents thereof.

I claim:

1. A foldable ramp comprising:
   a first ramp section;
   a first end member connected at one end to said first ramp section and having an inclined surface at the opposite end;
   a second ramp section hingedly connected to said first ramp section between a folded, storage position and an unfolded, working position;
   a second end member connected at one end to said second ramp section and having an inclined surface at the opposite end; and
   wherein during pivoting said second ramp section to said unfold, working position, said inclined surface of said second end member contacts said inclined surface of said first end member so as to prevent said second ramp section from pivoting to a coplanar position relative to said first ramp section.

2. The foldable ramp of claim 1, wherein said first ramp section comprises a plurality of interconnected elongated members.

3. The foldable ramp of claim 2, wherein said second ramp section comprises a plurality of interconnected elongated members.

4. The foldable ramp of claim 3, wherein said first and second ramps sections are hingedly connected longitudinally between a working position and a storage position.

5. The foldable ramp of claim 4, wherein said second ramp section is hingedly connected to said first ramp by at least one A-shaped hinge bracket.

6. The foldable ramp of claim 5, wherein said A-shaped hinge bracket includes mutually opposed, first and second inclined surfaces, wherein said first ramp section is fixed to said bracket along said first inclined surface and said second ramp section is pivotally connected to said bracket substantially along said second inclined surface, wherein during pivoting of said second ramp section to said working position, said second ramp section is further prevented from pivoting to a coplanar position relative to said first ramp section by engagement with said second inclined surface of said bracket.

7. The foldable ramp of claim 6, wherein said first and second ramp sections are made from aluminum.

8. A foldable ramp comprising:
   a first ramp section;
   a second ramp section;
   at least one hinge bracket, wherein one end of said hinge bracket is fixed said first ramp section and the other end of said hinge bracket is pivotally connected to said second ramp section so that said second ramp section is pivotally movable relative to said first ramp section between a folded, storage position and an unfolded, working position; and
   wherein said bracket prevents said second ramp section in said unfolded, working position from pivoting to a coplanar position relative to said first ramp section.

9. The foldable ramp of claim 8, wherein said hinge bracket comprises an A-shaped, hinge bracket.

10. The foldable ramp of claim 9, wherein said A-shaped hinge bracket includes mutually opposed, first and second inclined surfaces, wherein said first ramp section is fixed to said bracket along said first inclined surface and said second ramp section is pivotally connected to said bracket substantially along said second inclined surface, wherein during pivoting of said second ramp section to said working position, said second ramp section is prevented from pivoting to a coplanar position relative to said first ramp section by engagement with said second inclined surface of said bracket.

11. The foldable ramp of claim 10, wherein during pivoting of said second ramp section to said working position, said second ramp section is further prevented from pivoting to a coplanar position relative to said first ramp section by engagement with said first ramp section.

12. The foldable ramp of claim 11, further comprising:
    a first end member connected at one end to said first ramp section and having an inclined surface at the opposite end;
    a second end member connected at one end to said second ramp section and having an inclined surface at the opposite end;
    wherein during pivoting of said second ramp section to said unfold, working position, said inclined surface of said second end member confronts said inclined surface of said first end member so as to assist in preventing said second ramp section from pivoting to a coplanar position relative to said first ramp section.

13. A foldable ramp comprising:
    a first ramp section having an outwardly facing, inclined surface at one end thereof;
    a second ramp section having an outwardly facing, inclined surface at one end thereof;
    at least one hinge bracket fixed at one end to said first ramp section and pivotally connected at the other end to said second ramp section so that said second ramp section is pivotally movable relative to said first ramp section between a folded, storage position and an unfolded, working position; and
    wherein said inclined surfaces contact each other when said ramp is in said working position so as to prevent said second ramp section from pivoting to a coplanar position relative to said first ramp section.

14. The foldable ramp of claim 13, wherein said bracket comprises an A-shaped bracket.

15. The foldable ramp of claim 14, wherein said A-shaped hinge bracket includes mutually opposed, first and second inclined surfaces, wherein said first ramp section is fixed to said bracket along said first inclined surface and said second ramp section is pivotally connected to said bracket substantially along said second inclined surface, wherein during pivoting of said second ramp section to said working position, said second ramp section is prevented from pivoting to a coplanar position relative to said first ramp section by engagement with said second inclined surface of said bracket.

16. The foldable ramp of claim 15, wherein during pivoting of said second ramp section to said working position, said second ramp section is further prevented from pivoting to a coplanar position relative to said first ramp section by engagement with said first ramp section.

17. A foldable ramp comprising:
    a first ramp section comprising:
       a pair of elongated side members;
       a plurality of cross members mounted between said pair of side members;

an end member mounted transversely across one end of said pair of elongated side members, said end member having an inclined surface facing outwardly therefrom;

a second ramp section comprising:
  a pair of elongated side members;
  a plurality of cross members mounted between said pair of side members;
  an end member mounted transversely across one end of said pair of elongated side members, said end member having an inclined surface facing outwardly therefrom;

at least one A-shaped hinge bracket having mutually opposed, first and second inclined surfaces, said A-shaped hinge fixed to said first ramp section substantially along said first inclined surface, said second ramp section pivotally connected to said A-shaped hinge bracket substantially along said second inclined surface so that said second ramp section is movable relative to said first ramp section between an extended position and a folded position, wherein during rotation of said second ramp section to said extended position, the second ramp section is prevented from pivoting to a coplanar position relative to said first ramp section by confronting engagement between the inclined surfaces of said side members and engagement with the second inclined surface of said A-shaped hinge bracket.

* * * * *

UNITED STATES PATENT AND TRADEMARK OFFICE
CERTIFICATE OF CORRECTION

| | | |
|---|---|---|
| PATENT NO. | : 7,100,231 B2 | Page 1 of 1 |
| APPLICATION NO. | : 10/900023 | |
| DATED | : September 5, 2006 | |
| INVENTOR(S) | : Joseph J. Peschmann and Kawa-She-Quoen Okerlund | |

It is certified that error appears in the above-identified patent and that said Letters Patent is hereby corrected as shown below:

Column 3, Claim 1, Line 23, replace "unfold" with --unfolded--

Signed and Sealed this

Twelfth Day of December, 2006

JON W. DUDAS
*Director of the United States Patent and Trademark Office*